R. REHMEYER.
DEVICE FOR CRANKING GASOLENE OR OTHER ENGINES.
APPLICATION FILED MAY 13, 1910.

980,006.

Patented Dec. 27, 1910.

WITNESSES:

INVENTOR
Roy Rehmeyer
BY Mason, Fenwick & Lawrence
Attorneys

UNITED STATES PATENT OFFICE.

ROY REHMEYER, OF CHICAGO, ILLINOIS.

DEVICE FOR CRANKING GASOLENE OR OTHER ENGINES.

980,006.

Specification of Letters Patent.

Patented Dec. 27, 1910.

Application filed May 13, 1910. Serial No. 561,236.

*To all whom it may concern:*

Be it known that I, ROY REHMEYER, a citizen of the United States, residing at Chicago, in the county of Cook and State of Illinois, have invented certain new and useful Improvements in Devices for Cranking Gasolene and other Engines; and I do hereby declare the following to be a full, clear, and exact description of the invention, such as will enable others skilled in the art to which it appertains to make and use the same.

This invention relates to devices for cranking gasolene and other engines.

The object is to prevent the crank or lever from being reversed by the premature firing of the charge after compression, and the invention consists in the novel construction hereinafter described and claimed.

Figure 2:
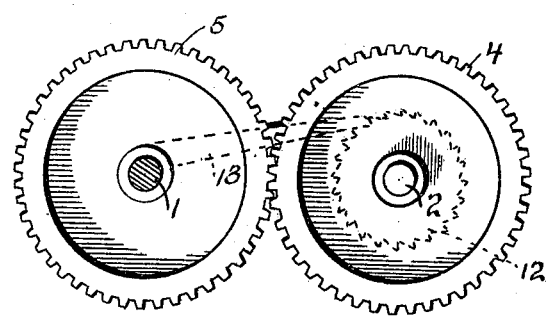
Figure 1:
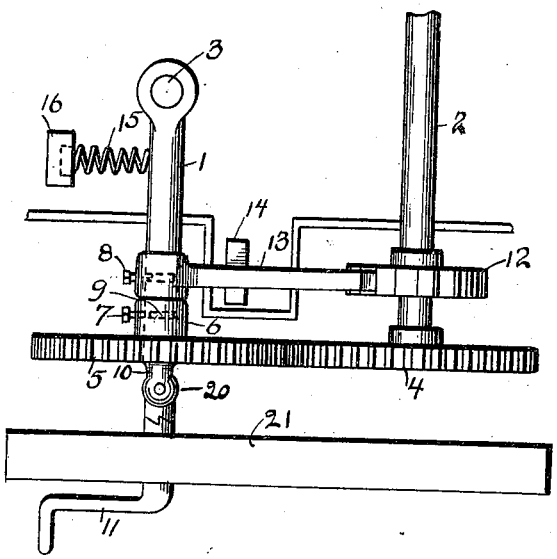

In the accompanying drawings forming a part of this application, Figure 1 is a top plan view showing the relation of the device to the crank shaft of an automobile. Fig. 2 is a detail view showing a gear wheel applied to the crank shaft, a second gear wheel meshing therewith, and the parts directly associated with such wheels.

In carrying out my invention, I make use of a supplemental shaft 1 which is attached to the crank casing at a point adjacent to the end of the crank shaft 2, the supplemental shaft 1 being arranged substantially parallel with the shaft 2 and pivoted at the point 3. Crank shaft 2 carries a gear wheel 4 on or near its outer end, and supplemental shaft 1 carries a gear wheel 5 arranged to mesh with the gear wheel first mentioned during the operation of cranking or compressing the charge. Gear wheel 4 is mounted rigidly upon shaft 2, but gear wheel 5 is carried loosely by shaft 1, such gear wheel 5 being provided with a collar 6 having pins 7 and 8 projecting therefrom into an annular groove 9 in shaft 1, whereby wheel 5 is held against sliding movement on shaft 1 but is free to rotate thereon. A rigid member 10 on one side of gear wheel 5 is provided with a universal joint 20 and suitable engaging devices for the accommodation of crank 11, which passes through radiator 21.

Shaft 2 carries a ratchet wheel 12 between the crank casing and gear wheel 4, which ratchet wheel is engaged by a pawl 13 loosely mounted on shaft 1, such pawl being held out of engagement with ratchet wheel 2 when desired by means of a block 14 which rests on a portion of the crank casing, and which is of sufficient thickness to cause the pawl to clear the teeth of ratchet wheel 12.

The pivoted shaft 1 has connected thereto a coil spring 15 the opposite end of which is secured to a bracket 16 on the crank casing, this spring serving to normally press shaft 1 toward shaft 2 so that these shafts will be parallel with each other and the gears carried thereby will mesh.

In operation, the crank is applied to the supplemental shaft instead of to the crank shaft, and the gear connected with the shaft first mentioned drives gear 4 connected with the crank shaft and rotates the latter. If the compressed charge is exploded unexpectedly or prematurely, the teeth of the ratchet wheel will cause pawl 13 to be thrown, thereby throwing shaft 1 outwardly and causing the gear wheels to be thrown out of mesh, thus preventing the rotation of gear wheel 5 and the consequent liability of causing injury to the operator. Shaft 1 is returned to its normal position through the action of spring 15, and the operation of cranking may then be continued.

What I claim is:—

1. In a device of the class described, a crank shaft, a supplemental shaft mounted adjacent thereto, means for pivoting one end of the supplemental shaft, a universal joint in the shaft last mentioned, a gear wheel carried by each of the shafts, and ratchet means for throwing the gear wheel out of mesh by the rotation of the crank shaft.

2. In a device of the class described, a crank shaft, a supplemental shaft mounted adjacent thereto, means for pivoting the supplemental shaft, a gear wheel carried by each of the shafts, such gear wheels being arranged to intermesh, a ratchet wheel carried by the crank shaft, and a pawl engaging the teeth of the ratchet wheel and pivotally mounted on the supplemental shaft.

3. In a device of the class described, a crank shaft, a gear wheel carried thereby, a ratchet wheel also carried by such shaft, a gear mounted independently of the crank shaft for driving the gear on such crank shaft, and means whereby the rotation of the crank shaft will throw said gears out of mesh.

4. In a device of the class described, a crank shaft, a gear wheel carried thereby, a ratchet wheel also carried by the crank shaft, a supplemental shaft mounted adjacent to the shaft first mentioned, means for pivoting the supplemental shaft, a gear mounted on the supplemental shaft and mounted to rotate thereon, a pawl carried by the supplemental shaft and arranged to engage the teeth of the ratchet wheel, means for rotating the gear on the supplemental shaft, and a spring for holding the supplemental shaft in position.

5. In a device of the class described, a crank shaft, a supplemental shaft mounted adjacent thereto, a gear wheel rigidly mounted on the crank shaft, a ratchet wheel also mounted thereon, a gear wheel rotatably mounted on the supplemental shaft, means engaging the ratchet wheel for swinging one end of the supplemental shaft outwardly and causing the gears to be thrown out of mesh, a spring for holding the supplemental shaft in position, and a device for throwing the means operating the supplemental shaft out of engagement with the ratchet wheel.

6. In a device of the class described, a crank shaft, a gear wheel rigidly carried thereby, a ratchet wheel rigidly mounted on the crank shaft, a supplemental shaft pivoted adjacent to the crank shaft and arranged substantially parallel therewith, a gear wheel loosely mounted on the supplemental shaft, a pawl also mounted on the supplemental shaft and arranged to engage the teeth of the ratchet wheel, a device for rotating the gear wheel on the supplemental shaft, a spring for holding the supplemental shaft in position, and a block arranged to throw the pawl out of engagement with the ratchet wheel.

In testimony whereof I affix my signature in presence of two witnesses.

ROY REHMEYER.

Witnesses:
   Geo. E. Wissler,
   L. A. Kapsa.